United States Patent
Hagiwara

Patent Number: 5,876,773
Date of Patent: *Mar. 2, 1999

[54] PROCESS OF MAKING A PLANT EXTRACT

[76] Inventor: Yoshihide Hagiwara, 4-14, Hiraisanso, Takarazuka-shi, Hyogo-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 644,266

[22] Filed: May 10, 1996

[30] Foreign Application Priority Data

| May 12, 1995 | [JP] | Japan | 7-137497 |
| May 12, 1995 | [JP] | Japan | 7-137500 |
| Aug. 4, 1995 | [JP] | Japan | 7-218255 |

[51] Int. Cl.[6] ........................................ A23L 1/29
[52] U.S. Cl. .......................... 426/270; 426/429; 426/430; 426/431; 426/626; 426/636; 426/640; 426/648; 426/655
[58] Field of Search ..................................... 426/270, 429, 426/430, 431, 648, 655, 636, 626, 640

[56] References Cited

U.S. PATENT DOCUMENTS 2,483,634  3/1949  Graham et al. ......................... 426/271

FOREIGN PATENT DOCUMENTS

| 60-007263 | 1/1985 | Japan . |
| 3108469 | 9/1989 | Japan . |
| 5065480 | 3/1991 | Japan . |
| 1589398 | 5/1981 | United Kingdom . |

*Primary Examiner*—Helen Pratt
*Attorney, Agent, or Firm*—Sherman and Shalloway

[57] ABSTRACT

A water-insoluble plant powder obtained by preparing a dry powder of green plant juice squeezed from a fresh raw edible green plant (e.g., barley) and removing water-soluble components from the dry powder, and a green coloring material obtained by further extracting it with a polar organic solvent. They are useful in food products.

9 Claims, No Drawings

PROCESS OF MAKING A PLANT EXTRACT

This invention relates to water-insoluble fraction powders prepared from fresh raw edible green plants and green coloring materials obtained therefrom.

Fresh raw edible green plants are very important foodstuffs for the maintenance of health, but they involve problems concerning edibility, for example, in that they are tough and hard to digest. Meanwhile, in order to solve these problems, various foodstuffs comprising green plant juice squeezed from a fresh raw edible green plant or its dry powder have been proposed in the prior art. However, they still involve problems in that their taste is irritating, pungent, bitter or astringent according to the type of the plant used as the starting material and, moreover, they have poor storage properties.

In order to solve the problem of poor storage properties, the present inventor has proposed a process in which green plant juice squeeze from a fresh raw edible green plant is adjusted to a pH in the range of 6 to 9 and then dried by a technique such as spray drying or freeze drying to form a dry powder (see Japanese Patent Publication No. 38548/71 and Japanese Patent Laid-Open No. 108469/91). This brings about a marked improvement in the storage properties of the green plant juice powder, but much room is left for improvement in taste.

As a result of further investigations made to improve the taste of a green plant juice powder, the present inventor has found that a bright-green stable dry powder having a light taste substantially free of bitterness, astringency, pungency and irritativenss and hence exhibiting excellent tastiness can be obtained by removing water-soluble components from the green plant juice powder.

Moreover, it has also been found that a bright-green coloring material can be obtained when the water-insoluble fraction obtained by removing water-soluble components from the green plant juice powder is further extracted with a polar organic solvent.

Thus, according to one aspect of the present invention, there is provided a water-insoluble plant powder obtained by preparing a dry powder of green plant juice squeezed from a fresh raw edible green plant and removing water-soluble components from the dry powder.

According to another aspect of the present invention, there is provided a green coloring material obtained by preparing a dry powder of green plant juice squeezed from a fresh raw edible green plant, separating a water-insoluble fraction of the dry powder, and further extracting the water-insoluble fraction with a polar organic solvent.

The present invention will be more specifically described hereinbelow.

The edible green plants which can be used as starting materials in the present invention include not only cultivated edible plants having green leaves or stems (hereinafter referred to as "leaves or stems"), but also edible wild grasses and herbs having green leaves and stems; plants having green leaves and stems which are not usually eaten, such as fruit vegetables, root crops, cereals and fruit trees; green edible algae; and the like. Specific examples thereof include green leaves of barley and wheat, spinach, lettuce, cabbage, Chinese cabbage, Japanese cabbage, cucumber, bitter melon, pimento, carrot leaves, radish leaves, parsley, celery, "ashitaba" (*Angelica keiskei* (Miq.) koidz.), comfrey leaves, green leaves of grasses (e.g., alfalfa, clover and kale), striped bamboo leaves, persimmon leaves, pine needles, spirulina, chlorella, "wakame seaweed" (*Undaria pinnatifida* (Harvey) Suringar) and green laver. These plants may be used alone or in combination of two or more.

Among the foregoing green plants, cereals such as barley, wheat, rye, oats, pearl barley, corn, millet and Italian ryegrass are preferred. Of these, barley (in particular, its leaves and stems before maturation) is most preferred.

It is desirable to treat these green plants while they are as fresh as possible. Where stored plants are used, it is preferable that they have been subjected to a proper measure for the prevention of discoloration and deterioration, such as inert gas storage, cold storage, deaerated and dehydrated storage, or treatment with sulfur dioxide or a sulfite salt. A green plant used as the starting material is thoroughly washed to remove all of the matter adhering thereto, sterilized with a germicide (e.g., hypochlorous acid) as desired, further washed thoroughly with water, and optionally cut to pieces of appropriate size. When cut to pieces, the plant may be soaked in a dilute aqueous solution of sodium chloride (e.g., a 0.1–2.0% aqueous solution of sodium chloride) and cut therein. Moreover, at any stage of this pretreatment, the plant may be subjected to a blanching treatment at a temperature of 100° to 140° C. under atmospheric pressure (or under subatmospheric or super-atmospheric pressure in some cases) for about 2 to 10 seconds and then cooled rapidly. This treatment serves to inactivate enzymes which may cause undesirable discoloration or deterioration of green plants (e.g., chlorophyllase, peroxidases and polyphenol oxidase).

After the green plant pretreated in the above-described manner is mixed with an appropriate amount of water, juice is squeezed therefrom. The squeezing can readily be carried out according to any conventionally known method, for example, by the combined use of a mechanical disintegration means (such as a mixer or juicer) and a solid-liquid separation means (such as centrifugation or filtration). Then, using a base, the resulting green juice of the edible green plant is adjusted to a pH of 6.2 to 9.5, preferably 6.5 to 8.5 and more preferably about 6.5 to 7.5.

The bases which can be used for the above-described pH adjustment include, for example, hydroxides, carbonates and bicarbonates of alkali metals and alkaline earth metals, such as sodium hydroxide, calcium hydroxide, magnesium hydroxide, sodium carbonate, potassium carbonate, calcium carbonate and sodium bicarbonate; ammonium hydroxide; glutamic acid salts such as calcium glutamate; and kelp extract.

At any stage following the separation of the green juice and preceding the drying treatment, the green plant juice treated according to the present invention may be subjected to a flash heating treatment for decomposing or inactivating undesirable enzymes which will participate in discoloration or deterioration, and also destroying bacteria which may be present therein. This treatment may be carried out under atmospheric pressure or under subatmospheric or super-atmospheric pressure, using, for example, a treating temperature of 90° to 150° C. and a treating time of about 180 to 2 seconds. After this treatment, it is desirable to cool the juice rapidly, particularly to a temperature of 10° C. or below.

As described previously, the green plant juice having undergone the pH adjustment is spray-dried or freeze-dried, preferably spray-dried, as soon as possible. The spray drying or freeze drying may be carried out according to any conventionally known method.

For example, in the case of spray drying, hot spray drying using hot air at about 120° to 200° C. and preferably about 140° to 170° C., or cold spray drying using air dried with a suitable desiccant such as lithiurn chloride may be employed. In the case of freeze drying, treating conditions such as a drying plate temperature of 40° to 50° C. and a vacuum of the order of 1.0 to 0.01 mmHg are usually employed.

The concentration of the green plant juice used in the drying step should be in the range of about 1.5 to 30% and preferably as high as possible within those limits. In order to concentrate the green juice to this end, a continuous thin-film concentrator, vacuum concentrator or the like may be used. Moreover, in the course of the above-described procedures, various means, such as the replacement of air by an inert gas (e.g., nitrogen or argon), the inclusion of an oxygen absorber (e.g., glucose oxidase), maintenance at low temperatures, and protection from light, may be used alone or in combination to prevent the green plant juice from being discolored or deteriorated during transfer and storage preceding the drying step.

The green plant juice powder prepared in the above-described manner is then extracted with water to remove water-soluble components therefrom. This water extraction may be carried out, for example, by suspending the green plant juice powder in water and stirring the resulting suspension. The amount of water used to suspend the green plant juice powder is not strictly limited, but may vary widely. However, it is generally suitable to use water in an amount of 2 to 50 liters, preferably 5 to 20 liters, per kilogram of the green plant juice powder.

This water extraction can usually be carried out at room temperature. In some cases, it may be carried out under warmed conditions up to about 50° C.

This water extraction may be repeated until essentially all of the water-soluble components present in the green plant juice powder are removed. The degree of removal of the water-soluble components can be confirmed, for example, by determining cations (e.g., $K^+$, $Na^+$, $Ca^{2+}$ and $Mg^{2+}$) or anions (e.g., $NO_3^-$, $Cl^-$ and $SO_4^{2-}$) in the washings.

As a result of the above-described water extraction procedure, the water-soluble components contained in the green plant juice powder e.g, cations and anions such as $Na^+$, $K^+$, $Mg^{2+}$, $Ca^{2+}$, $Cl^-$, $NO_2^-$, $SO_4^{2-}$, $PO_4^{3-}$ and $Si^{2-}$; organic salts such as acetic acid, formic acid, citric acid, tartaric acid and succinic acid; and water-soluble proteins, sugars and amino acids are removed. Thus, there is obtained a water-insoluble plant powder which is rich in chlorophyll, lipids, water-insoluble proteins, polysaccharides, fat-soluble vitamins, and protein- or sugar-bound minerals. Moreover, it has been found that, when leaves and stems of barley before maturation are used as the starting material, there is obtained a plant powder which contains, in addition to the foregoing components, an abundance of n-hexacosyl alcohol and β-sitosterol having an anticholesterol action, 2"-O-glucosylisovitexin having antioxidant activity, and the like.

The plant powders provided by the present invention are substantially free of undesirable substances usually contained in the leaves and stems of plants, such as various metallic elements and materials accelerating the deterioration of foods. Consequently, they can be advantageously used in the fields of drugs and foods.

Although the plant powders of the present invention can be directly used for eating and drinking purposes, they may be combined with cyclodextrin, crown ethers and the like to form clathrate compounds, if necessary. Moreover, they may be blended with excipients, extenders, binders, thickeners, emulsifiers, colorants, perfumes, food additives, seasonings and the like, and formed into powder, granules, pellets, tablets, oily matter or the like according to their use and other factors.

Thus, the plant powders of the present invention can be used for eating and drinking purposes by incorporating them into a variety of food products including, for example, various processed foods (such as processed products of young cereal leaves, processed vegetable products, processed seaweed products, canned foods, bottled foods and processed meat products), soup, snacks, drinks, bread and noodles.

According to another aspect of the present invention, the water-insoluble fraction of green plant juice obtained in the above-described manner is then extracted with a polar organic solvent. The polar organic solvents which can be used for this extraction include, for example, alcohols such as methanol, ethanol, n-propanol and 2-propanol; ketones such as acetone and methyl ethyl ketone; ethers such as ethyl ether; and esters such as ethyl acetate and methyl acetate. These polar organic solvents may be used alone or in admixture of two or more. Among others, solvent mixtures composed of an alcohol and a ketone (in particular, a solvent mixture composed of ethanol and acetone) are most preferred. In this solvent mixture, the weight ratio of ethanol to acetone is usually in the range of 10/1 to 1/100, preferably 5/1 to 1/50 and more preferably 2/1 to 1/10.

The amount of polar organic solvent used for this extraction is not strictly limited, but may vary widely according to the type of the solvent used and other factors. For example, when the most preferred solvent mixture composed of ethanol and acetone (in a weight ratio of 10/1 to 1/100) is used, it is generally suitable to use this solvent mixture in an amount of 500 to 5,000 ml, preferably 700 to 2,000 ml, per 100 g of the water-insoluble fraction of green plant juice.

This extraction may be carried out under temperature conditions ranging from a low temperature of about 5° C. to an elevated temperature of about 70° C., but room temperature (i.e., about 15° to about 25° C. ) will usually suffice. Under the above-described conditions, the extraction time may range from about 30 minutes to about 20 hours and preferably from about 2 to about 15 hours. Moreover, this extraction may be carried out by stirring the mixture or by allowing the mixture to stand.

After completion of the extraction, an extract is obtained by removing the insoluble solid matter according to any conventional solid-liquid separation technique such as filtration or centrifugation. Then, this extract is freed of organic solvent, for example, by evaporation or distillation under reduce pressure (or in vacuo) to obtain a green extracted material.

After suitable excipients such as dextrin, cyclodextrin, starch, maltose, maltitol, glucose and fructose are added as required, this extracted material may be dried by such means as vacuum drying, spray drying or freeze drying to obtain a powdered bright-green coloring material.

An aqueous dispersion of the aforesaid extracted material has a pH of about 6.5. However, if the aforesaid extract or extracted material is adjusted to a pH of about 7.5 with a base as described above and dried in the above-described manner, it is possible to obtain a dry powder which can be completely dissolved in water to give a bright-green clear solution.

The powdered green coloring material obtained in the above-described manner consists essentially of chlorophyll and additionally contains fat-soluble vitamins and the like. When leaves and stems of barley before maturation are used as the starting material, it also contains n-hexacosyl alcohol and β-sitosterol having an anticholesterol action, 2"-O-glucosylisovitexin having antioxidant activity, and the like.

As described above, the powdered coloring materials of the present invention have excellent storage stability, contain a large amount of chlorophyll, and assume a bright green color. Consequently, they can be used, for example, as food coloring materials for coloring various food products.

Moreover, the coloring materials of the present invention have an agreeable sweet taste and can be directly used for eating and drinking purposes. However, if necessary, they may be combined with cyclodextrin, crown ethers and the like to form clathrate compounds. Furthermore, they may be blended with excipients, extenders, binders, thickeners, emulsifiers, colorants, perfumes, food additives, seasonings and the like, and formed into powder, granules, pellets, tablets, oily matter or the like according to their use and other factors.

Thus, the coloring materials of the present invention can be used for eating and drinking purposes by incorporating them into a variety of food products including, for example, various processed foods (such as processed products of young cereal leaves, processed vegetable products, processed seaweed products, canned foods, bottled foods and processed meat products), soup, snacks, drinks, bread and noodles.

On the other hand, it has been found that the water-soluble fraction obtained in the above-described water extraction of the green plant juice powder is also very useful for use in health foods and as a food material, because it contains large amounts of trace essential elements including cations such as $Na^+$, $K^+$, $Mg^{2+}$ and $Ca^{2+}$, various anions, and water-soluble organic acids such as acetic acid, citric acid, tartaric acid and succinic acid, and is rich in water-soluble proteins, sugars, amino acids, and useful enzymes such as SOD and various hydrolases.

Thus, according to a further aspect of the present invention, there is provided a water-soluble plant extract obtained from a dry powder of green plant juice squeezed from a fresh raw edible green plant.

According to this aspect of the present invention, a green plant juice powder prepared in the above-described manner is subjected to exactly the same water extraction as described above, and the resulting water-soluble fraction is recovered. Specifically, this water extraction may be carried out in the same manner as described above, for example, by suspending the green plant juice powder in water and stirring this suspension. The amount of water used to suspend the green plant juice powder is not strictly limited, but may vary widely. However, it is generally suitable to use water in an amount of 2 to 50 liters, preferably 5 to 20 liters, per kilogram of the green plant juice powder.

This water extraction can usually be carried out at room temperature. In some cases, it may be carried out under warmed conditions up to about 50° C.

As a result of the above-described water extraction procedure, the water-insoluble components contained in the green plant juice powder, such as chlorophyll, lipids, water-insoluble proteins, polysaccharides, fat-soluble vitamins, and protein- or sugar-bound minerals are removed. Thus, there is obtained a water-soluble plant extract which is rich in cations and anions such as $Na^+$, $K^+$, $Mg^{2+}$, $Ca^{2+}$, $Cl^-$, $NO_2^-$, $SO_4^{2-}$, $PO_4^{3-}$ and $Si^{2-}$; organic salts such as acetic acid, formic acid, citric acid, tartaric acid and succinic acid; water-soluble proteins, sugars and amino acids; useful enzymes such as SOD and various hydrolases; and the like. Moreover, when leaves and stems of barley before maturation are used as the starting material, there is obtained a water-soluble plant extract which contains, in addition to the foregoing components, an abundance of 2"-O-glucosylisovitexin having antioxidant activity, and the like.

The resulting water extract may be concentrated under reduced pressure as required, or may be deproteinized by heat treatment and then concentrated in some cases. Alternatively, it may be dried by such means as spray drying or freeze drying.

The water-soluble plant extracts provided by the present invention (in particular, the water-soluble plant extract obtained by using barley as the starting material) contain many physiologically active components including various water-soluble proteins, sugars, vitamins and minerals which are usually contained in the green leaves of the starting material. Among others, they abundantly contain SOD, calatase and peroxidases that are enzymes participating in the elimination of active enzyme species causative of various diseases, as well as various substances having antioxidant activity (in particular, a relatively large amount of 2"-O-glucosylisovitexin). Consequently, they can be advantageously used in the fields of foods and drugs in which resistance to oxidation is required.

Thus, the water-soluble plant extracts of the present invention can be used for eating and drinking purposes, either directly or after being concentrated. If necessary, they may be combined with cyclodextrin, crown ethers and the like to form clathrate compounds. Moreover, they may be blended with excipients, extenders, binders, thickeners, emulsifiers, colorants, perfumes, food additives, seasonings and the like, and then formed into powder, granules, pellets, tablets, oily matter or the like according to their use and other factors.

Furthermore, the water-soluble plant extracts of the present invention may be treated with an ion-exchange resin or an ion-exchange membrane, if necessary, in order to remove anions and-or cations partially and thereby achieve an improvement in taste. In particular, their stability of quality and their safety for use as foods can be enhanced by removing anions such as $Cl^-$, $NO_3^-$ and $NO_2^-$.

The above-described water-soluble plant extracts of the present invention can be used as (concentrated) drinks, either directly or after being concentrated. Alternatively, they can be blended with fruit sugar, grape sugar, raw leaf extracts, vitamins, perfumes and the like to make (concentrated) drinks. Moreover, they can be used for eating and drinking purposes by incorporating them into a variety of food products including, for example, various processed foods (such as processed products of young cereal leaves, processed vegetable products, processed seaweed products, canned foods, bottled foods and processed meat products), soup, snacks, drinks, bread and noodles.

The present invention is further illustrated by the following examples.

EXAMPLE 1

Young green leaves of barley (i.e., leaves and stems of barley before maturation) were thoroughly washed, disintegrated with a mixer, and squeezed. Then, green juice was obtained by filtering off the fibrous residue. One hundred liters of this green juice was adjusted to pH 7.2 with sodium hydroxide and then spray-dried at a supplied air temperature of 170° C. to obtain 4.3 kg of green juice powder.

After 1 kg of this green juice powder was suspended in 20 liters of water, the resulting suspension was stirred for 30 minutes with a paddle agitator and then centrifuged (at 3,500 rpm). The solid matter was recovered, dispersed in water, and spray-dried at a supplied air temperature of 170° C. to obtain 450 g of water-insoluble barley powder. The results of analysis of the water-insoluble barley powder thus obtained were as shown in Table 1 below. Its chlorophyll content was 2.25%.

TABLE 1

Results of analysis of
water-insoluble barley powder

| Component | Content |
|---|---|
| Water | 3.2% |
| Protein | 47.5% |
| Lipid | 7.2% |
| Fibers | 0.3% |
| Ash | 22.1% |
| Sugar | 18.7% |

Using a panel comprising 30 male and female tasters, a green juice powder prepared from young leaves of barley according to the process described in Example 1 of Japanese Patent Publication No. 38548/71 and the above-described water-insoluble barley powder of Example 1 were tested at a concentration of 3 g/100 ml. As a result, 28 tasters judged that the water-insoluble barley powder of Example 1 had a less bitter and less pungent taste than the conventional green juice powder and was hence superior in edibility.

EXAMPLE 2

A novel dark-green food product enriched with chlorophyll, fat-soluble vitamins and the like was made by adding 50 g of the water-insoluble barley powder obtained in Example 1 above to 100 g of a green juice powder prepared from young leaves of barley according to the process described in Example 1 of Japanese Patent Publication No. 38548/71.

The resulting green juice powder of young barley leaves was a highly tasty product having a less bitter and less pungent taste.

EXAMPLE 3

In the same manner as described in Example 1, 100 kg of kale was washed and squeezed to obtain 95 liters of green juice. This green juice was spray-dried to obtain 4.1 kg of green kale juice powder. After this green kale juice powder was suspended in 10 liters of water, the resulting suspension was stirred for 30 minutes with a paddle agitator and then centrifuged. The solid matter was recovered, dispersed in water, and spray-dried at a supplied air temperature of 170° C. Thus, there was obtained 2.3 kg of green kale powder having a less bitter and less pungent taste and containing chlorophyll, carotene and fat-soluble vitamins (such as vitamin E).

EXAMPLE 4

Five hundred grams of the water-insoluble barley powder obtained in Example 1 was blended with 500 g of lactose and 1 kg of dextrin. This blend was granulated to obtain 2 kg of a novel health food having high stability and excellent tastiness.

EXAMPLE 5

Twenty grams of the water-insoluble barley powder obtained in Example 1 was blended with 80 g of dextrin, 150 g of purified fish oil and 25 g of beeswax as a dispersant. Then, a fish oil food product was made by filling 270 mg each of the resulting blend into soft capsules in the usual manner.

EXAMPLE 6

The water-insoluble barley powder obtained in Example 1 was added to the raw materials of bread (i.e., 300 g of enriched flour, 20 g of granulated sugar, 3.4 g of yeast, 50 g of salt, 250 g of water and 20 g of butter) in such an amount as to give a concentration of 2%. Then, bread was made according to the usual recipe and procedure for the making of bread. The bread so made was a high-quality product assuming a bright green color and having aroma.

EXAMPLE 7

Two parts (on a weight basis; hereinafter the same) of the water-insoluble barley powder obtained in Example 1 was added to the following raw materials of ice cream.

| Ingredient | Amount |
|---|---|
| Saltless butter | 7.0 parts |
| Powdered whole milk | 5.0 parts |
| Condensed whole milk | 10.0 parts |
| Fresh cream | 10.0 parts |
| Cane sugar | 10.0 parts |
| CMC | 0.3 part |
| Water | 55.7 parts |
| | 98.0 parts |

Then, ice cream was made according to the usual process for the making of ice cream. The ice cream so made assumed a bright green color.

EXAMPLE 8

After 1,000 ml of an acetone/ethanol solvent mixture (in a weight ratio of 4:1) was added to 200 g of a water-insoluble barley powder prepared in the same manner as described in Example 1, extraction was carried out for 2 hours with stirring. Then, the mixture was filtered to obtain 980 ml of filtrate (pH 6.8). Five milliliters of a 10% aqueous solution of sodium hydroxide was added to and mixed with this filtrate. The resulting mixture was held at 50° C. for an hour (so that the pH rose to 9.3) and then vacuum-dried at 38° C. to obtain about 150 g of a pasty concentrate.

After this concentrate was mixed with 200 g of lactose, the resulting mixture was vacuum-dried to obtain 210 g of dry powder. This dry powder assumed a bright green color and contained 1.25% of chlorophyll.

EXAMPLE 9

After 700 ml of an acetone/ethanol solvent mixture (in a weight ratio of 5:1) was added to 200 g of a water-insoluble barley powder prepared in the same manner as described in Example 1, this mixture was stirred for 5 hours. Then, the mixture was filtered to obtain 870 ml of an extract. After this extract was concentrated in vacuo at 32°–35° C., 120 g of dextrin was added to the resulting concentrate. This mixture was spray-dried at a solid content of 25% by weight, an inlet temperature of 170° C. and an outlet temperature of 120° C. to obtain 145 g of green dry powder. This dry powder contained 1.52% of chlorophyll.

EXAMPLE 10

The procedure of Example 9 was repeated, except that an acetone/ethanol solvent mixture (in a weight ratio of 1:1) was used in place of the acetone/ethanol solvent mixture (in a weight ratio of 5:1). As a result, there was obtained 120 g of green dry powder. This dry powder contained 1.38% of chlorophyll.

EXAMPLE 11

Kale powder prepared in the same manner as described in Example 3 was subjected to a solvent extraction treatment in the same manner as described in Example 8. Thus, there was obtained 187 g of dry powder. This dry powder assumed a bright green color and contained 0.43% of chlorophyll.

EXAMPLE 12

Two grams of the green coloring material obtained in Example 8 was blended with 70 g of granulated sugar, 30 g of starch syrup and 0.5 g of perfume. Thus, there was obtained a novel candy assuming a bright green color and having high stability and excellent tastiness.

EXAMPLE 13

Two grams of the green coloring material obtained in Example 9 was blended with 88 g of dextrin, 150 g of purified fish oil and 25 g of beeswax as a dispersant. Then, a green fish oil food product was made by filling 270 mg each of the resulting blend into soft capsules in the usual manner.

EXAMPLE 14

The green coloring material obtained in Example 8 was added to the raw materials of bread (i.e., 300 g of enriched flour, 20 g of granulated sugar, 3.4 g of yeast, 50 g of salt, 250 g of water and 20 g of butter) in such an amount as to give a concentration of 2%. Then, bread was made according to the usual recipe and procedure for the making of bread.

The bread so made was a high-quality product assuming a bright green color and having aroma.

EXAMPLE 15

One-half part (on a weight basis; hereinafter the same) of the green coloring material obtained in Example 8 was added to the following raw materials of ice cream.

| Ingredient | Amount |
| --- | --- |
| Saltless butter | 7.0 parts |
| Powdered whole milk | 5.0 parts |
| Condensed whole milk | 10.0 parts |
| Fresh cream | 10.0 parts |
| Cane sugar | 10.0 parts |
| CMC | 0.3 part |
| Water | 57.2 parts |
| | 99.5 parts |

Then, ice cream was made according to the usual process for the making of ice cream. The ice cream so made assumed a bright green color.

EXAMPLE 16

Young green leaves of barley (i.e., leaves and stems of barley before maturation) were thoroughly washed, disintegrated with a mixer, and squeezed. Then, green juice was obtained by filtering off the fibrous residue. One hundred liters of this green juice was adjusted to pH 7.2 with sodium hydroxide and then spray-dried at a supplied air temperature of 170° C. to obtain 4.5 kg of green juice powder.

After 1 kg of this green juice powder was suspended in 20 liters of water, the resulting suspension was stirred for 30 minutes with a paddle agitator and then centrifuged (at 3,500 rpm). The solid matter was separated to recover 18 liters of a water-soluble fraction, and 550 g of dextrin was added thereto. The resulting mixture was adjusted to a final concentration of 20% and spray-dried at a supplied air temperature of 170° C. to obtain 1.05 kg of water-soluble barley powder. This water-soluble barley powder contained 3.58 mg/g of 2"-O-glucosylisovitexin.

The results of analysis of the water-soluble barley powder thus obtained were as shown in Table 2 below.

TABLE 2

| Component | Content |
| --- | --- |
| Water | 3.70% |
| Protein | 14.75% |
| Lipid | 0.09% |
| Fibers | — |
| Ash | 21.22% |
| Sugar | 57.87% |

EXAMPLE 17

Forty grams of the water-soluble barley powder obtained in Example 16 was blended with 40 g of dextrin, 150 g of purified fish oil and 25 g of beeswax as a dispersant. Then, a fish oil food product was made by filling 270 mg each of the resulting blend into soft capsules in the usual manner.

EXAMPLE 18

The water-soluble barley powder obtained in Example 16 was added to the raw materials of bread (i.e., 300 g of enriched flour, 20 g of granulated sugar, 3.4 g of yeast, 50 g of salt, 250 g of water and 20 g of butter) in such an amount as to give a concentration of 2%. Then, bread was made according to the usual recipe and procedure for the making of bread. The bread so made was a high-quality product having an aroma peculiar to young leaves of barley.

EXAMPLE 19

Two parts by weight of the water-soluble barley powder obtained in Example 16 was added to the following raw materials of ice cream.

| Ingredient | Amount |
| --- | --- |
| Saltless butter | 7.0 parts by weight |
| Powdered whole milk | 5.0 parts by weight |
| Condensed whole milk | 10.0 parts by weight |
| Fresh cream | 10.0 parts by weight |
| Cane sugar | 10.0 parts by weight |
| CMC | 0.3 part by weight |
| Water | 55.7 parts by weight |
| | 98.0 parts by weight |

Then, ice cream was made according to the usual process for the making of ice cream. The ice cream so made was a product having an aroma peculiar to young leaves of barley.

EXAMPLE 20

After 20 liters of water was added to 2 kg of the green juice powder prepared from young barley leaves in Example 16, this mixture was stirred for 30 minutes and then centrifuged (at 3,500 rpm) to obtain 17 liters of supernatant liquid. This liquid was heated to boil for 10 minutes and then centrifuged to obtain 15 liters of supernatant liquid. This liquid was concentrated to 2 liters, mixed with 1 liter of the ion-exchange resin IRA400, and stirred for 30 minutes. After removal of the resin, the liquid was adjusted to pH 6.5 with lactic acid for use as a food additive. A mixture of equal amounts of cane sugar and fruit sugar was added to this liquid, and its volume was adjusted to 5 liters by the addition of water. Finally, a perfume was added to obtain a concentrated drink.

What is claimed is:

1. A process for producing an edible food additive from green plants which consists essentially of the steps of
   (1) treating a fresh raw edible green plant to squeeze a green plant juice from the green plant and recovering the green plant juice,
   adjusting the pH of the green plant juice to a pH of 6.2 to 9.5,
   spray-drying or freeze-drying the green plant juice to obtain a green plant powder,
   (2) water extracting the green plant powder by contacting the powder with water at a ratio of 2 to 50 liters of water per kilogram of green plant juice powder to extract water-soluble components from the green juice powder and recovering water-insoluble green plant powder comprising chlorophyll, lipids, water-insoluble proteins, polysaccharides, fat-soluble vitamins and protein- or sugar-bound minerals, and
   (3) solvent extracting the water-insoluble components by contact with a polar organic solvent consisting essentially of a mixture $C_1$ to $C_3$ alkyl alcohol and a $C_1$ to $C_2$ alkyl ketone in which the weight ratio of alkyl alcohol to alkyl ketone is 10/1 to 1/100 and the amount of the solvent mixture to the water-insoluble component is 500 to 5000 ml per 100 g of the water-insoluble component of the green plant juice, and
   recovering the solvent extract components from the solvent mixture to obtain a powdered bright green material which consist essentially of chlorophyll and fat-soluble vitamins.

2. The process of claim 1 in which the edible green plant consists essentially of leaves and stems of barley before maturation and there is obtained a water-insoluble plant powder containing n-hexacosyl alcohol, βsitosterol and 2"-O-glucosylisovitexin in addition to the foregoing components.

3. The process of claim 1 in which the water extraction step 2 is carried out by contacting the powder with water at a ratio of 5 to 20 liters of water per kilogram of the green powder.

4. The process of claim 1 in which solvent extraction step (3) is carried out by contacting the water-insoluble components with a polar organic solvent consisting essentially of ethanol and acetone at a weight ratio of ethanol to acetone of 2/1 to 1/10 and the amount of the solvent mixture to the water-insoluble components is 700 to 2000 ml per 100 g of the water-insoluble components.

5. The process of claim 1 wherein the fresh raw edible cereal plant is a member selected from the group consisting of barley, wheat, rye, oats, corn, millet and Italian rye grass.

6. A process for producing an edible food additive from green plants which consists essentially of the steps of
   (1) treating a fresh raw edible green plant consisting essentially of the leaves and stems of barley before maturation to squeeze a green plant juice from the green plant and recovering the green plant juice,
   adjusting the pH of the green plant juice to a pH of 6.2 to 9.5,
   spray-drying or freeze-drying the green plant juice to obtain a green plant powder,
   (2) water extracting the green plant powder by contacting the powder with water at a ratio of 2 to 50 liters of water per kilogram of green plant juice powder to extract water-soluble components from the green juice powder and recovering water-insoluble green plant powder components comprising chlorophyll, lipids, water-insoluble proteins, polysaccharides, fat-soluble vitamins and protein- or sugar-bound minerals, and
   (3) solvent extracting the water-insoluble components by contact with a polar organic solvent consisting essentially of a mixture ethanol and acetone in which the weight ratio of ethanol to acetone is 2/1 to 1/10 and the amount of the solvent mixture to the water-insoluble component is 500 to 5000 ml per 100 g of the water-insoluble component of the green plant juice, and
   recovering the solvent extract components from the solvent mixture to obtain a powdered bright green material which consist essentially of chlorophyll and fat-soluble vitamins.

7. The process of claim 6 in which there is obtained a water-insoluble plant powder containing n-hexacosyl alcohol, β-sitosterol and 2"-O-glucosylisovitexin in addition to the foregoing components.

8. The process of claim 6 in which the water extraction step 2 is carried out by contacting the powder with water at a ratio of 5 to 20 liters of water per kilogram of the green powder.

9. The process of claim 6 in which solvent extraction step (3) is carried out by contacting the water-insoluble components with the polar organic solvent and the amount of the solvent mixture to the water-insoluble components is 700 to 2000 ml per 100 g of the water-insoluble components.

* * * * *